United States Patent
Ueda et al.

(10) Patent No.: US 7,298,963 B2
(45) Date of Patent: Nov. 20, 2007

(54) TIME CODE GENERATOR AND TIME CODE GENERATING METHOD, TIME CODE READER AND TIME CODE READING METHOD, AND VIDEO RECORDING AND REPRODUCING APPARATUS

(75) Inventors: Yoshihito Ueda, Kanagawa (JP); Tomokiyo Kato, Kanagawa (JP); Hiroaki Kikuchi, Kanagawa (JP); Yoshiaki Tanaka, Kanagawa (JP)

(73) Assignee: Sony Corporation (JP)

( * ) Notice: Subject to any disclaimer, the term of this patent is extended or adjusted under 35 U.S.C. 154(b) by 820 days.

(21) Appl. No.: 10/805,286

(22) Filed: Mar. 22, 2004

(65) Prior Publication Data

US 2004/0197081 A1    Oct. 7, 2004

(30) Foreign Application Priority Data

Apr. 1, 2003   (JP) ............................. P2003-098247

(51) Int. Cl.
    *H04N 5/91* (2006.01)
(52) U.S. Cl. ............................. 386/95; 386/4; 386/65; 369/59.24; 369/59.26

(58) Field of Classification Search .................. 386/95
See application file for complete search history.

(56) References Cited

U.S. PATENT DOCUMENTS

| 6,526,216 B1 * | 2/2003 | Morimoto et al. ............ 386/52 |
| 6,694,088 B1 * | 2/2004 | Sakai .......................... 386/52 |
| 2003/0210892 A1 * | 11/2003 | Yoshida et al. ............... 386/65 |

* cited by examiner

*Primary Examiner*—Thai Q. Tran
*Assistant Examiner*—Daniel Tekle
(74) *Attorney, Agent, or Firm*—Rader Fishman & Grauer PLLC; Ronald P. Kananen (57) ABSTRACT

The present invention provides an apparatus for generating a time code compatible with 50P, 60P or 59.94P and having interchangeability with existing time codes. The apparatus includes: a microcomputer for dividing a frame number indicated by time address data in supplied code word data to obtain a quotient and a remainder; and the microcomputer and a time code reader for replacing the frame number indicated by the time address data in the code word data with the quotient and for generating a time code based on the code word data in which a value of a color frame flag is set to 0 if the remainder is 0 and for replacing the frame number with the quotient and for generating the time code based on the code word data in which the value of the color frame flag is set to 1 if the remainder is 1.

8 Claims, 13 Drawing Sheets

|  | FRAME | | | | FRAME | | |
|---|---|---|---|---|---|---|---|
|  | 1 | 2 | 4 | 8 | 10 | 20 | 40 |
| 00 FRAME | 0 | 0 | 0 | 0 | 0 | 0 | 0 |
| 01 FRAME | 1 | 0 | 0 | 0 | 0 | 0 | 0 |
| ⋮ | ⋮ | | | | ⋮ | | |
| 39 FRAME | 1 | 0 | 0 | 1 | 1 | 1 | 0 |
| 40 FRAME | 0 | 0 | 0 | 0 | 0 | 0 | 1 |
| 41 FRAME | 1 | 0 | 0 | 0 | 0 | 0 | 1 |
| ⋮ | ⋮ | | | | ⋮ | | |

INVERSION OF MAGNITUDE RELATION

| | FRAME | | | | FRAME | | FRAME |
| --- | --- | --- | --- | --- | --- | --- | --- |
| | 1 | 2 | 4 | 8 | 20 | 40 | 1 |
| 00 FRAME | 0 | 0 | 0 | 0 | 0 | 0 | 0 |
| 01 FRAME | 0 | 0 | 0 | 0 | 0 | 0 | 1 |
| 02 FRAME | 1 | 0 | 0 | 0 | 0 | 0 | 0 |
| 03 FRAME | 1 | 0 | 0 | 0 | 0 | 0 | 1 |
| ⋮ | ⋮ | | ⋮ | | ⋮ | | ⋮ |
| 18 FRAME | 1 | 0 | 0 | 1 | 0 | 0 | 0 |
| 19 FRAME | 1 | 0 | 0 | 1 | 0 | 0 | 1 |
| 20 FRAME | 0 | 0 | 0 | 0 | 1 | 0 | 0 |
| 21 FRAME | 0 | 0 | 0 | 0 | 1 | 0 | 1 |
| ⋮ | ⋮ | | ⋮ | | ⋮ | | ⋮ |
| 38 FRAME | 1 | 0 | 0 | 1 | 1 | 0 | 0 |
| 39 FRAME | 1 | 0 | 0 | 1 | 1 | 0 | 1 |
| 40 FRAME | 0 | 0 | 0 | 0 | 0 | 1 | 0 |
| 41 FRAME | 0 | 0 | 0 | 0 | 0 | 1 | 1 |
| ⋮ | | | ⋮ | | ⋮ | | ⋮ |

| FRAMES DROPPED IN 30-FRAME SYSTEM | FRAMES TO BE DROPPED IN 60-FRAME SYSTEM |
|---|---|
| 00:01:00:00 | 00:01:00:00 |
|  | 00:01:00:01 |
| 00:01:00:01 | 00:01:00:02 |
|  | 00:01:00:03 |
| 00:02:00:00 | 00:02:00:00 |
|  | 00:02:00:01 |
| 00:02:00:01 | 00:02:00:02 |
|  | 00:02:00:03 |
| 00:03:00:00 | 00:03:00:00 |
|  | 00:03:00:01 |
| 00:03:00:01 | 00:03:00:02 |
|  | 00:03:00:03 |
| 00:04:00:00 | 00:04:00:00 |
|  | 00:04:00:01 |
| 00:04:00:01 | 00:04:00:02 |
|  | 00:04:00:03 |
| 00:05:00:00 | 00:05:00:00 |
|  | 00:05:00:01 |
| 00:05:00:01 | 00:05:00:02 |
|  | 00:05:00:03 |
| ⋮ | ⋮ |

TIME CODE GENERATOR AND TIME CODE GENERATING METHOD, TIME CODE READER AND TIME CODE READING METHOD, AND VIDEO RECORDING AND REPRODUCING APPARATUS

CROSS REFERENCE TO RELATED APPLICATIONS

The present document claims priority to Japanese Priority Document JP 2003-098247, filed in the Japanese Patent Office on Apr. 1, 2003, the entire contents of which are incorporated herein by reference to the extent permitted by law.

BACKGROUND OF THE INVENTION

1. Field of the Invention

The present invention relates to a time code generator and a time code generating method, a time code reader and a time code reading method, and a video recording and reproducing device having functions of generating and reading a time code.

2. Description of the Related Art

Time codes standardized by SMPTE (Society of Motion Picture and Television Engineers, Inc.) are classified into a 24-frame system time code, a 25-frame system timed code, and a 30-frame system time code.

The 24-frame system is used for films and is compatible with a frame rate of 24 frames/sec.

The 25-frame system is used for 625/50 televisions and is compatible with 25P (25 frames/sec in a progressive mode) and 50i (50 fields/sec in an interlaced mode).

The 30-frame system is used for 1125/60 HDTVs or NTSC and is compatible with 30P (30 frames/sec in a progressive mode), 29.97P (29.97 frames/sec in a progressive mode), 60i (60 fields/sec in an interlaced mode) and 59.94i (59.94 fields/sec in an interlaced mode).

Conventionally, there exists a large number of time code generators for generating time codes in the 24-frame system, the 25-frame system and the 30-frame system and time code readers for reading time codes in the 24-frame system, the 25-frame system and the 30-frame system.

However, there has not been any time code generators for generating time codes compatible with 50P (50 frames/sec in a progressive mode), 60P (60 frames/sec a progressive mode) and 59.94P (59.94 frames/sec in a progressive mode) or any time code readers for reading such time codes.

The applicant of the present invention has developed an HDCAM-SR format ("HDCAM" is a registered trademark) as a compression format of an HDTV signal. The HDCAM-SR format allows the recording/reproduction not only in 25P, 29,97P, 50i and 59.94i but also in 59.94P.

Therefore, a time code generator or a time code reader to be included in a video recording and reproducing apparatus adopting the HDCAM-SR format is also required to be compatible with 59.94P.

Moreover, since there has not been any time codes compatible with 50P, 60P, or 59.94P, it is desirable that a time code generated by the time code generator compatible with 59.94P has interchangeability with time codes in the existing 24-frame system, 25-frame system and 30-frame system (or readable by time code readers for time codes in the 24-frame system, the 25-frame system and the 30-frame system).

SUMMARY OF THE INVENTION

In view of the above-described points, the present invention is devised to provide a generator and a method of generating a time code having compatibility with 50P, 59.94P or 60P and having interchangeability with existing time codes, a reader and a method of reading such a time code, and a video recording and reproducing apparatus having functions of generating and reading such a time code.

According to an embodiment of the present invention, there is provided a time code generator including: means for dividing a frame number indicated by time address data in supplied code word data by 2 so as to obtain a quotient and a remainder; and means for replacing the frame number indicated by the time address data in the code word data with a value of the quotient and for generating a time code based on the code word data in which a value of a color frame flag is set to 0 if a value of the remainder is 0, and for replacing the frame number indicated by the time address data in the code word data with the value of the quotient and for generating a time code based on the code word data in which the value of the color frame flag is set to 1 if a value of the remainder is 1.

The time code generator according to the present embodiment may further include means for performing drop frame correction by dropping frames of frame numbers 00, 01, 02 and 03 at every minute, except every tenth minute (00, 10, 20, 30, 40, 50).

According to another aspect of the invention, the present invention provides a time code generating method including the steps of: dividing a frame number indicated by time address data in supplied code word data by 2 so as to obtain a quotient and a remainder; and replacing the frame number indicated by the time address data in the code word data with a value of the quotient and generating a time code based on the code word data in which a value of a color frame flag is set to 0 if a value of the remainder is 0, and replacing the frame number indicated by the time address data in the code word data with the value of the quotient and generating a time code based on the code word data in which the value of the color frame flag is set to 1 if the value of the remainder is 1.

The time code generating method according to the present embodiment may further include a step of performing drop frame correction by dropping frames of frame numbers 00, 01, 02 and 03 at every minute, except every tenth minute (00, 10, 20, 30, 40, 50).

According to another embodiment of the present invention, there is provided a time code reader including: means for reading a time code; means for multiplying a frame number indicated by time address data in the time code by 2 to obtain a product; and means for replacing the frame number indicated by the time address data in the time code with a value obtained by adding 1 to the product if a value of a color frame flag in the time code is 1, and for replacing the frame number indicated by the time address data in the time code with the value of the product if the value of the color frame flag in the time code is 0.

According to another embodiment of the present invention, there is provided a time code reading method including the steps of: reading a time code; multiplying a frame number indicated by time address data in the time code by 2 to obtain a product; and replacing the frame number indicated by the time address data in the time code with a value obtained by adding 1 to the product if a value of a color frame flag in the time code is 1, and replacing the frame number indicated by the time address data in the time code with the value of the product if the value of the color frame flag in the time code is 0.

According to another embodiment of the present invention, there is provided a video recording and reproducing apparatus including: means for dividing a frame number indicated by time address data in supplied code word data by 2 so as to obtain a quotient and a remainder; means for replacing the frame number indicated by the time address data in the code word data with a value of the quotient and for generating a time code based on the code word data in which a value of a color frame flag is set to 0 if a value of the remainder is 0, and for replacing the frame number indicated by the time address data in the code word data with the value of the quotient and for generating a time code based on the code word data in which the value of the color frame flag is set to 1 if the value of the remainder is 1; means for recording supplied video data with the generated time code onto a recording medium; means for reproducing data from the recording medium; means for reading the time code from the reproduced data; means for multiplying a frame number indicated by time address data in the readout time code by 2 to obtain a product; and replacing the frame number indicated by the time address data in the time code with a value obtained by adding 1 to the product if a value of a color frame flag in the readout time code is 1, and for replacing the frame number indicated by the time address data in the readout time code with the value of the product if the value of the color frame flag in the readout time code is 0.

The video recording and reproducing apparatus according to the present embodiment may further include means for performing drop frame correction by dropping frames of frame numbers 00, 01, 02 and 03 at every minute, except every tenth minute (00, 10, 20, 30, 40, 50).

As described above, according to the embodiments of the present invention, the time code that is compatible with 50P, 60P or 59.94P and has interchangeability with existing time codes may be generated and read by slightly modifying the existing process or circuit.

Moreover, the drop frame correction for compensating for a difference between elapsed time and real time in 59.94P can be performed.

DESCRIPTION OF THE PREFERRED EMBODIMENTS

[Study of a Time Code in a 60-Frame System]

First, results of study of a time code in a 60-frame system (a time code compatible with 50P, 60P or 59.94P) which has interchangeability with the existing time codes standardized by SMPTE will be described.

Figure 1:
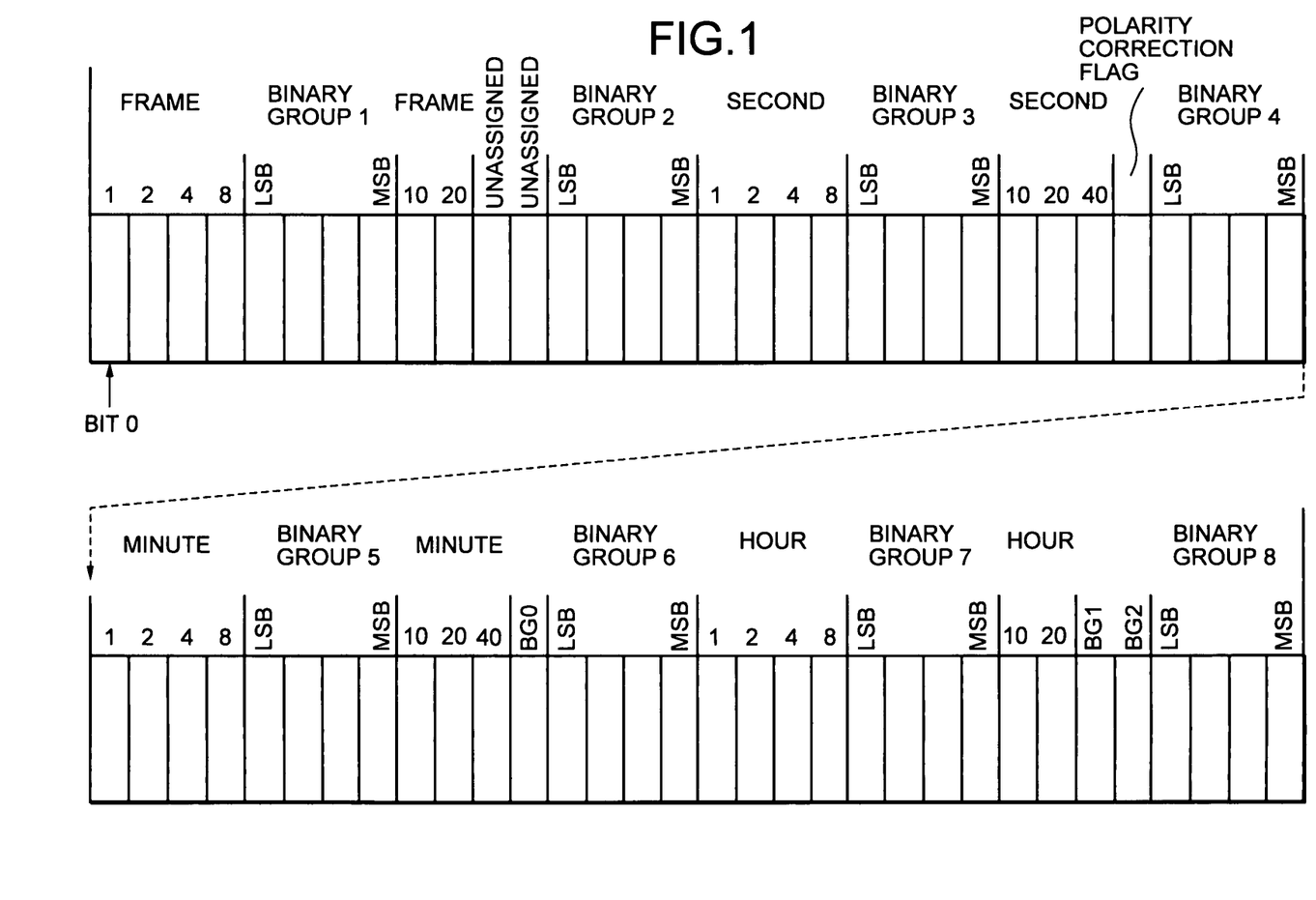
FIG. 1 is a diagram showing a code word format of a time code in a 24-frame system.
Figure 2:
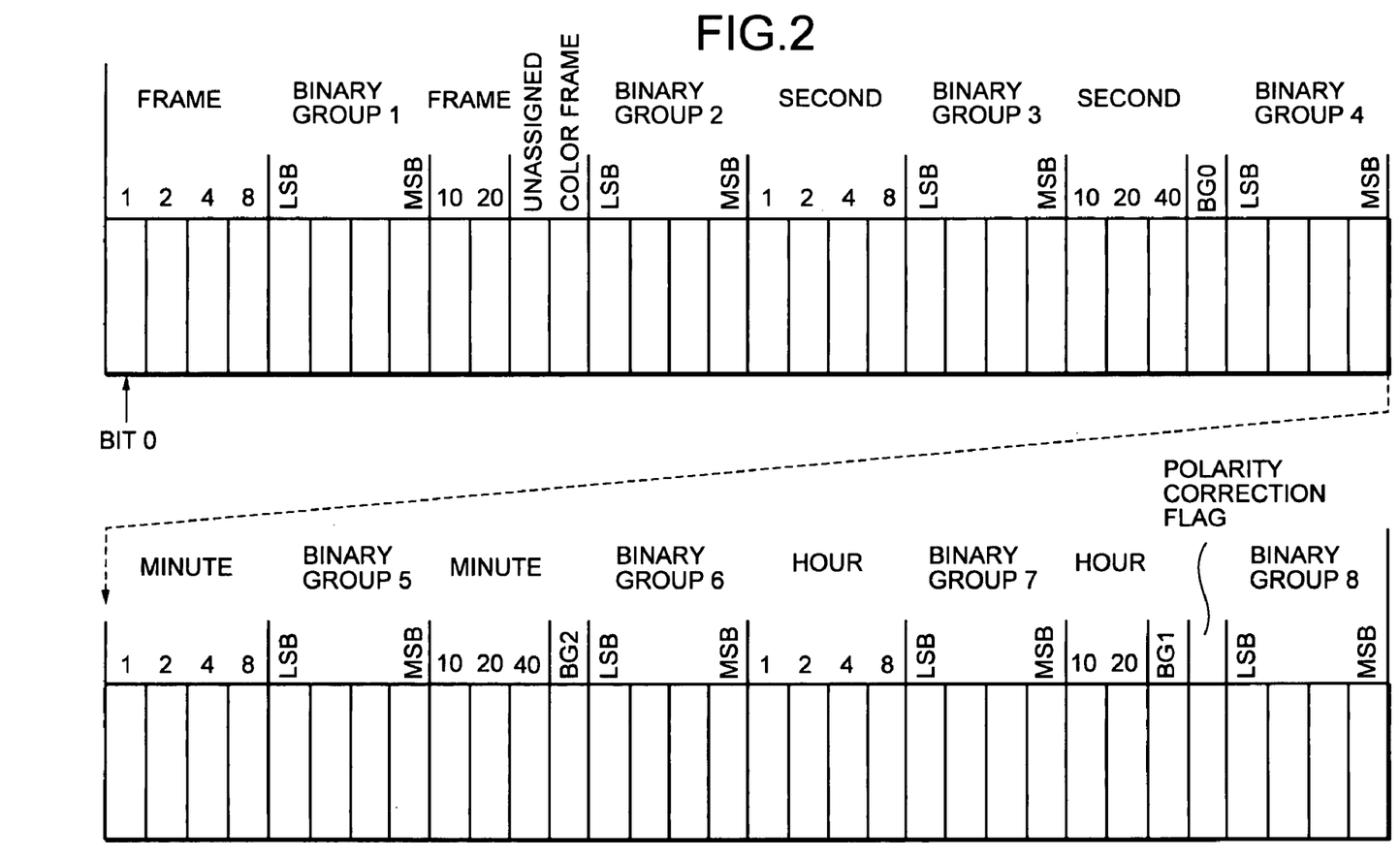
FIG. 2 is a diagram showing a code word format of a time code in a 25-frame system.
Figure 3:
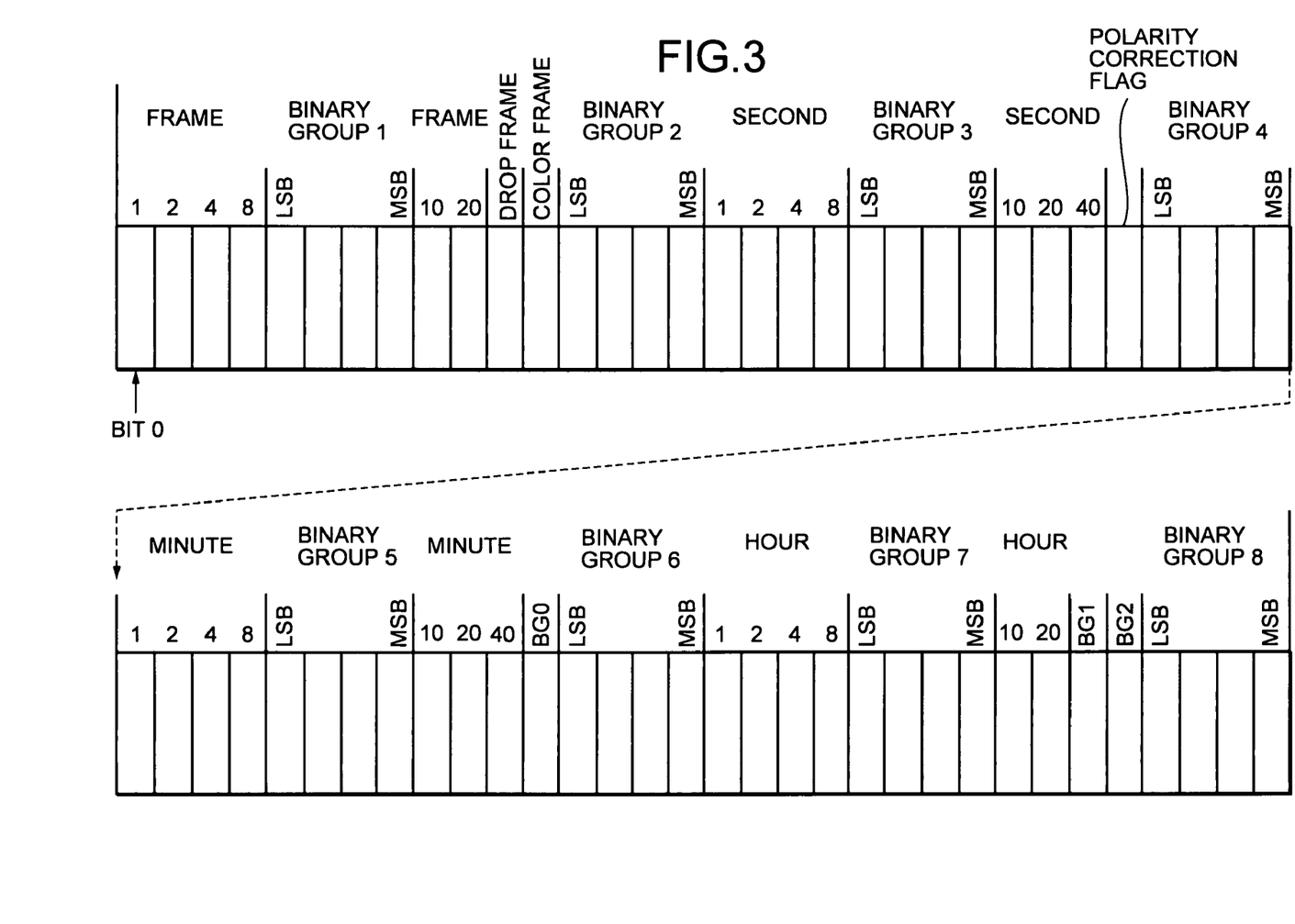
FIG. 3 is a diagram showing a code word format of a time code in a 30-frame system.

FIGS. 1 to 3 are diagrams showing code word formats of time codes in a 24-frame system, in a 25-frame system and in a 30-frame system standardized by SMPTE, respectively.

Each of the code words of these time codes is composed of 80 bits. One code word corresponds to a single frame. The code word contains: a time address indicating hour, minute, second and a frame number; a flag bit; a binary group (user's bit); and a sync word (although the sync word starts with the 64th bit and ends at the 80th bit, the bits up to the 63rd bit, just before the start of the sync word, are illustrated).

The positions of the frame numbers in the time address are as follows. The positions indicating single-digit numbers correspond to four bits from the 0th bit to the third bit (the position indicating a value "1" corresponds to the 0th bit, the position indicating a value "2" corresponds to the first bit, the position indicating a value "4" corresponds to the second bit, and the position indicating a value "8" corresponds to the third bit). The position indicating a value "10" corresponds to the 8th bit, and the position indicating a value "20" corresponds to the 9th bit.

In the time code in the 24-frame system, the 10th bit and the 11th bit are unassigned. In a time code in the 25-frame system, the 10th bit is unassigned, whereas the 11th bit is assigned to a color frame flag. In a time code in the 30-frame system, the 10th bit is assigned to a drop frame flag, whereas the 11th bit is assigned to a color frame flag.

Figure 4:
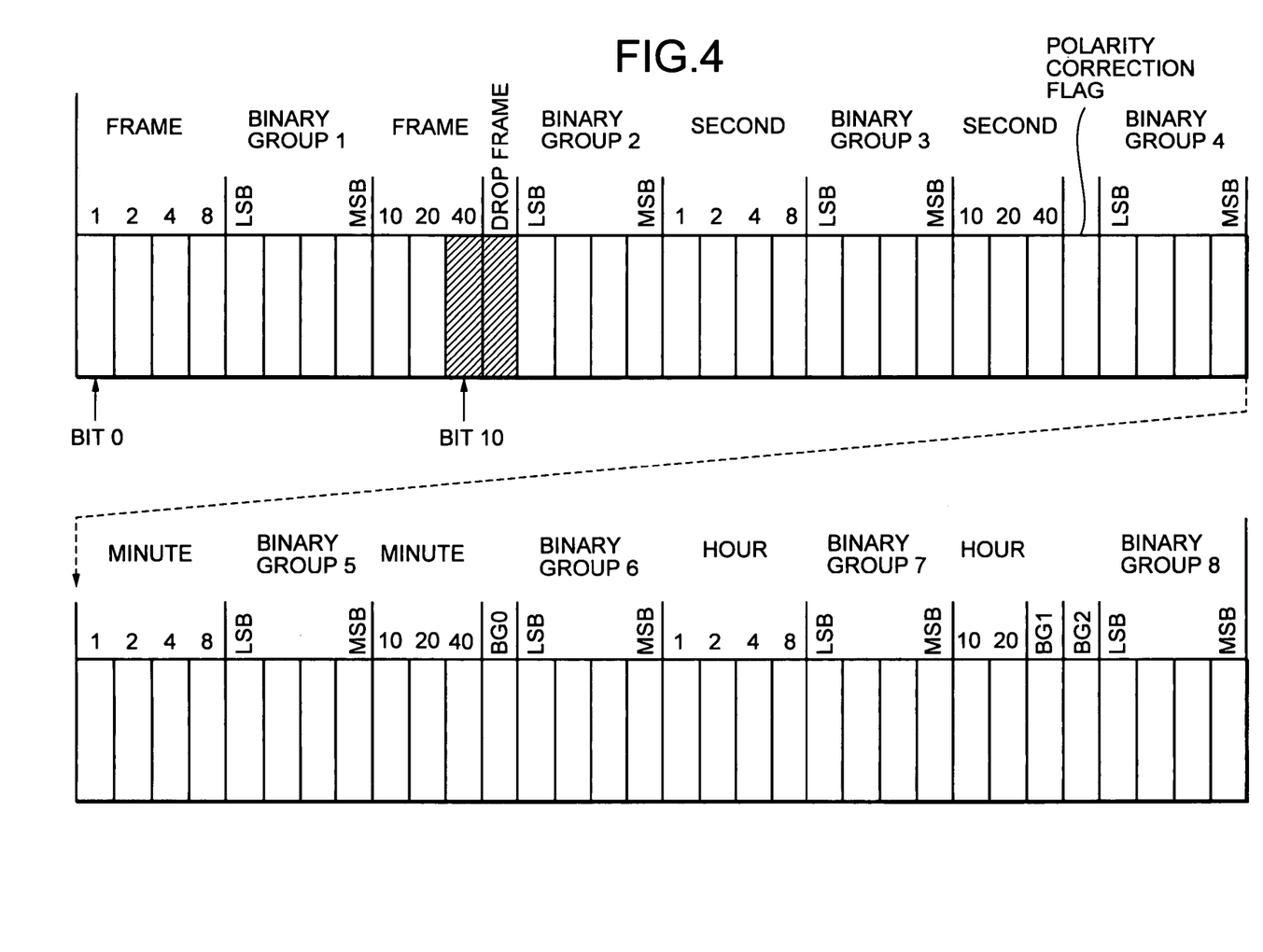
FIG. 4 is a diagram showing a first embodiment of a code word format of a time code in a 60-frame system.

FIG. 4 shows a first embodiment of a code word format of a time code in a 60-frame system based on the existing code word format of the time code as described above.

In this first embodiment, as in the existing time code, the positions indicating the single-digit numbers correspond to four bits from the 0th bit to the third bit. The position indicating a value "10" of the frame number corresponds to the 8th bit, and the position indicating a value "20" of the frame number corresponds to the 9th bit. In addition, in this embodiment, the position indicating a value "40" of the frame number corresponds to the 10th bit, and the position indicating a drop frame flag is positioned at the 11th bit. The assignment of the other bits is the same as that in the time code in a 30-frame system.

Figure 5:
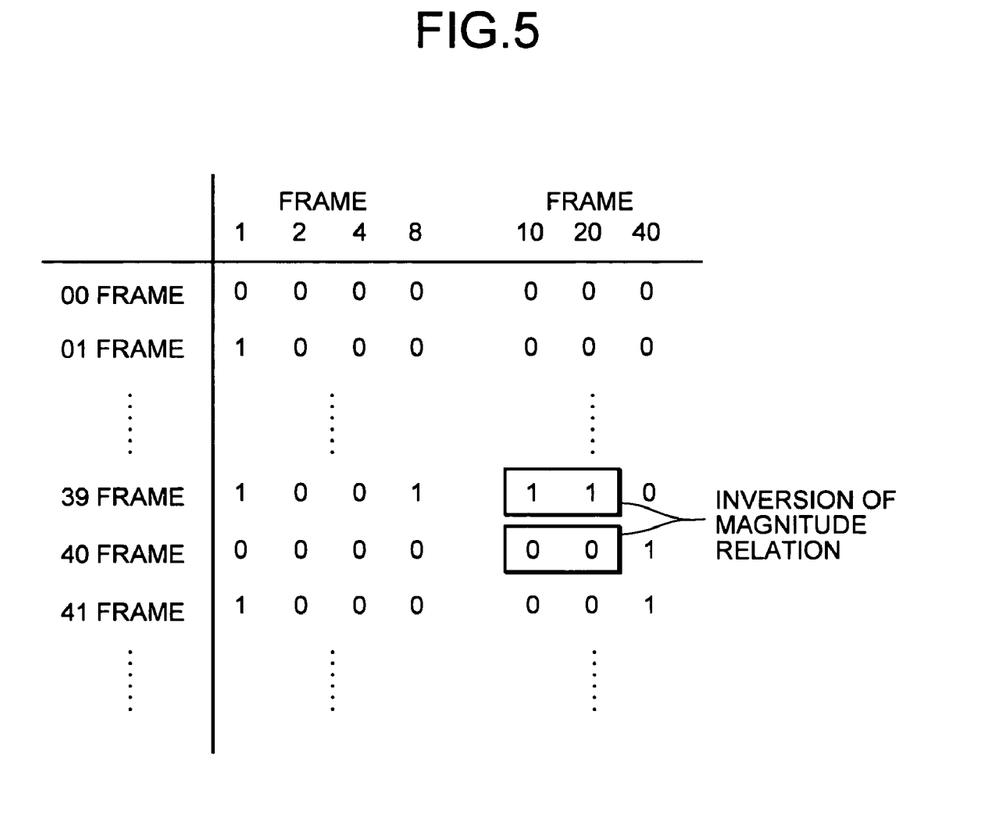
FIG. 5 is a diagram showing a representation of frame numbers in a code word format shown in FIG. 4.

FIG. 5 shows the representation of frame numbers in the code word format according to the first embodiment. The 10th bit is set to "0" in the frame numbers 00 to 39. The same representation as in the existing time code appears at the 0th to the third bits, the 8th bit and the 9th bit. Then, the 10th bit is set to "1" at the frame number 40 and the following frame numbers. In the frame number 40 or more, the same representation as in the frame numbers 00 and the following frame numbers is repeated at the 0th to the third bits, the 8th bit and the 9th bit.

The code word format described above is compatible with 50P, 60P or 59.94P. Moreover, since the frame numbers up to 79 can be represented in the code word format, this code word format will be compatible with a recording and reproducing method of video data in future 72P (72 frames/sec in a progressive mode).

However, if the time code in the code word format is to be read by any of existing time code readers (for time codes in the 24-frame system, the 25-frame system and the 30-frame system) which recognize only the 0th to the third, the 8th and the 9th bits as bits indicating frame numbers, the 10th bit is not recognized as a bit indicating a frame number. Therefore, as shown in FIG. 5, at the transition from the frame number 39 to the frame number 40, the frame numbers are read as if the order of these frames were reversed because the values at the 8th and 9th bits change from "1" "1" to "0" "0".

Thus, in this regard, the code word format according to the first embodiment does not have high interchangeability with existing time codes.

Figure 6:
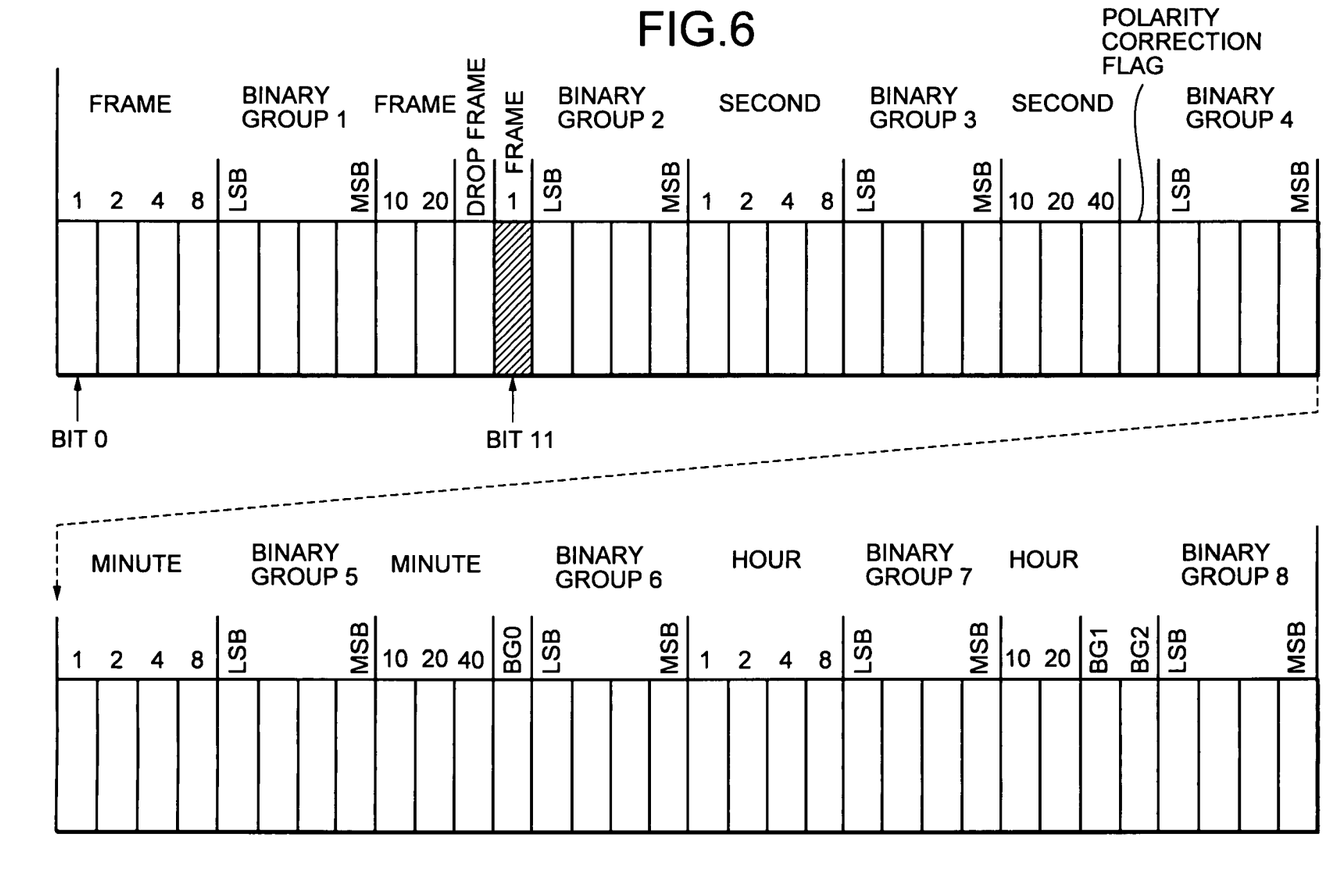
FIG. 6 is a diagram showing a second embodiment of a code word format of the time code in a 60-frame system.

Next, FIG. 6 shows a second embodiment of the code word format of the time code in the 60-frame system.

In the second embodiment, the position indicating a value "1" of the frame number corresponds to the 11th bit. The position indicating a value "2" of the frame number corresponds to the 0th bit; the position indicating a value "4" of the frame number corresponds to the first bit; the position indicating a value "8" of the frame number corresponds to the second bit; the position indicating a value "16" of the frame number corresponds to the third bit; the position indicating a value "20" of the frame number corresponds to the 8th bit; and the position indicating a value "40" of the frame number corresponds to the 9th bit.

In other words, the position of a color frame flag in the time codes in the 25-frame system or the 30-frame system is set at the position indicating a value "1" of the frame number. At the same time, the values indicated by the 0th to the third bits, the 8th bit and the 9th bit which are assigned to the positions of the frame numbers in the time codes are shifted up by one bit, respectively. The assignment of the remaining bits is the same as that in the time code in the 30-frame system.

Figure 7:
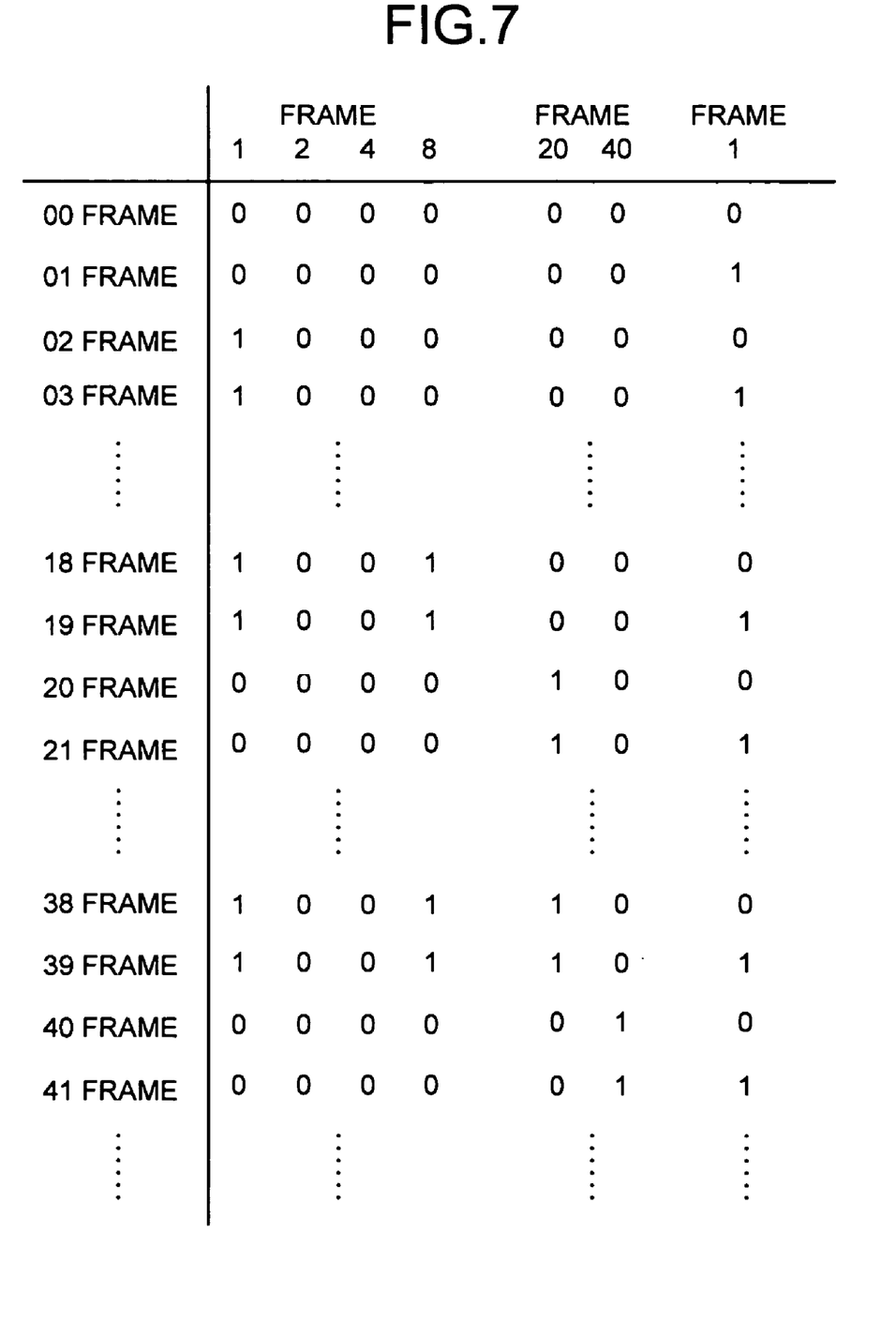
FIG. 7 is a diagram showing a representation of frame numbers in a code word format shown in FIG. 6.

FIG. 7 shows the representation of frame numbers in a code word format according to the second embodiment. The 11th bit becomes to be set to "0" in even frame numbers, whereas the 11th bit becomes to be set to "1" in odd frame numbers. At the 0th to the third bits, the 8th bit and the 9th bit, each pair of an even frame number and the subsequent odd frame number (00 and 01; 02 and 03; etc.) has the same representation.

The code word format is also compatible with 50P, 60P or 59.94P. Moreover, since the code word format can include the frame numbers up to 79, the code word format will be compatible with a recording and reproducing method of video data in future 72P (72 frames/sec in a progressive mode).

The time code of this code word format is not read as if the order of the frame numbers were inversed even when it is read by existing time code readers (for time codes in the 24-frame system, the 25-frame system and the 30-frame system), which recognize only the 0th to the third bits, the 8th bit and the 9th bit as bits indicating the frame numbers. In addition, the frame number can be read as its half value.

Furthermore, in the time code of the code word format described above, the position of a drop frame coincides with that of the time code in the 30-frame system.

Therefore, the code word format according to the second embodiment has high interchangeability with an existing time code.

[A Digital VTR with the Application of the Present Invention]

Based on the results of examination as described above, a digital VTR provided with the functions of generating and reading the time code of the code word format according to the second embodiment will now be described.

Figure 8:
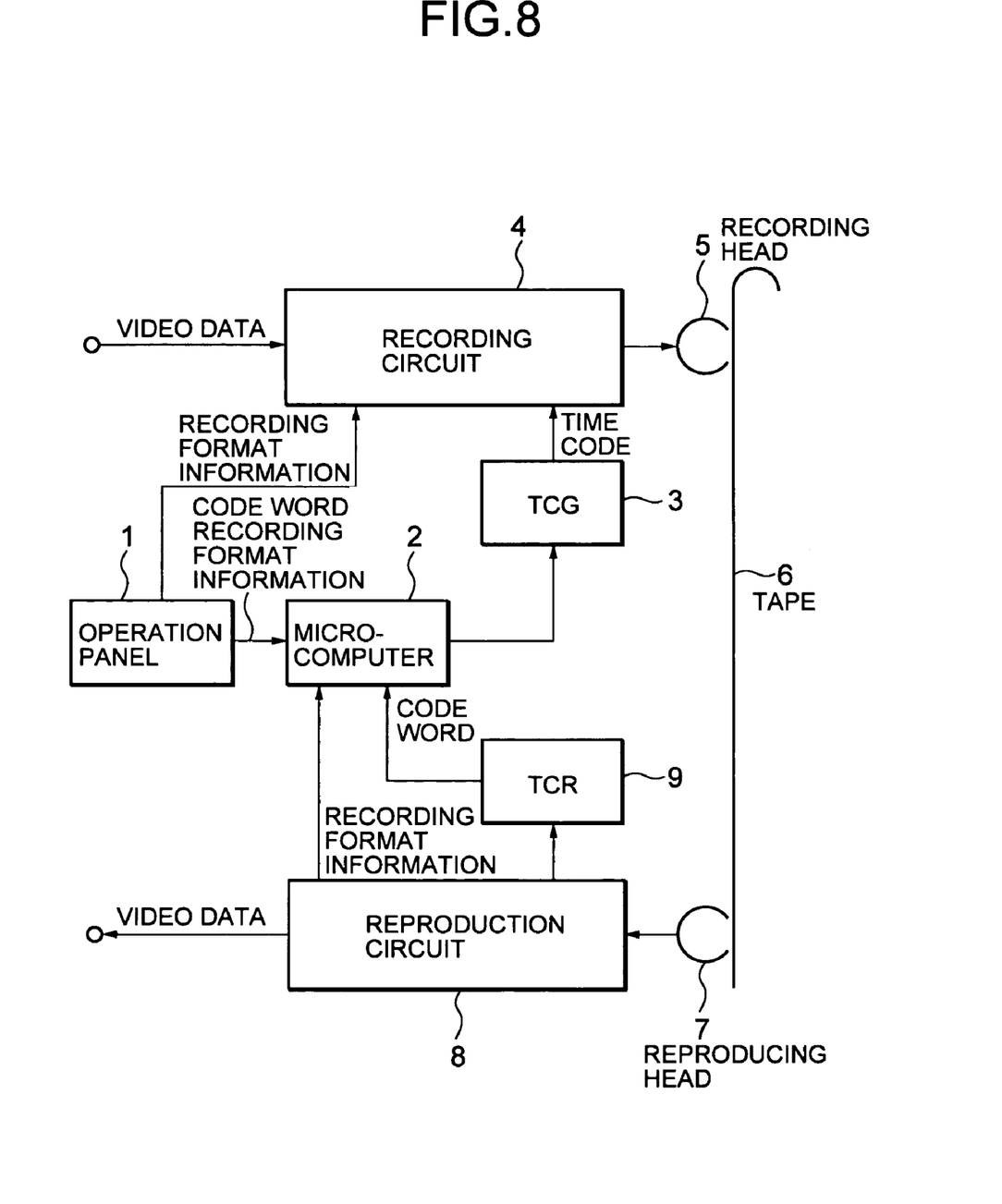
FIG. 8 is a block diagram showing a circuit configuration of a digital VTR according to the present invention.

FIG. 8 is a block diagram showing the schematic of a circuit configuration of the digital VTR. On an operation panel 1 of the digital VTR, an operation button for selecting any one recording format of video data from 60P, 50P, 30P, 60i, 25P and 50i is provided.

In addition, on the operation panel 1, another operation button for arbitrarily setting an initial value of a time address or a binary group (user's bit) in the code word data of the time code is also provided.

The information of a recording format set by the operation of the above-mentioned operation buttons and code word data are transmitted from the operation panel 1 to a microcomputer 2.

A recording circuit 4 performs: digital conversion of analog video data; bit rate compression of digital video data; error correction coding; recording coding; synthesis of time codes from a time code generator (TCG) 3; and the like. After video data supplied from the exterior to the digital VTR is converted into the recording format selected on the operation panel 1, the video data is recorded with a recording head 5 on a tape 6.

A reproduction circuit 8 performs: waveform equalization of an output from a reproducing head 7; reproduction of a clock; decoding of the recording code; expansion of the compressed bit rate; analog conversion of the digital video data; and the like. The time code in the reproduced data, which is obtained by the reproduction circuit 8, is read by a time code reader (TCR) 9.

The time code generator 3 and the time code reader 9 have the same structures as those of existing time code generator and time code reader (for time codes in the 24-frame system, the 25-frame system, and the 30-frame system), respectively.

The code word data of the time code read by the time code reader 9 and the information of the recording format in the reproduced data by the reproduction circuit 8 are transmitted to the microcomputer 2.

Figure 9:
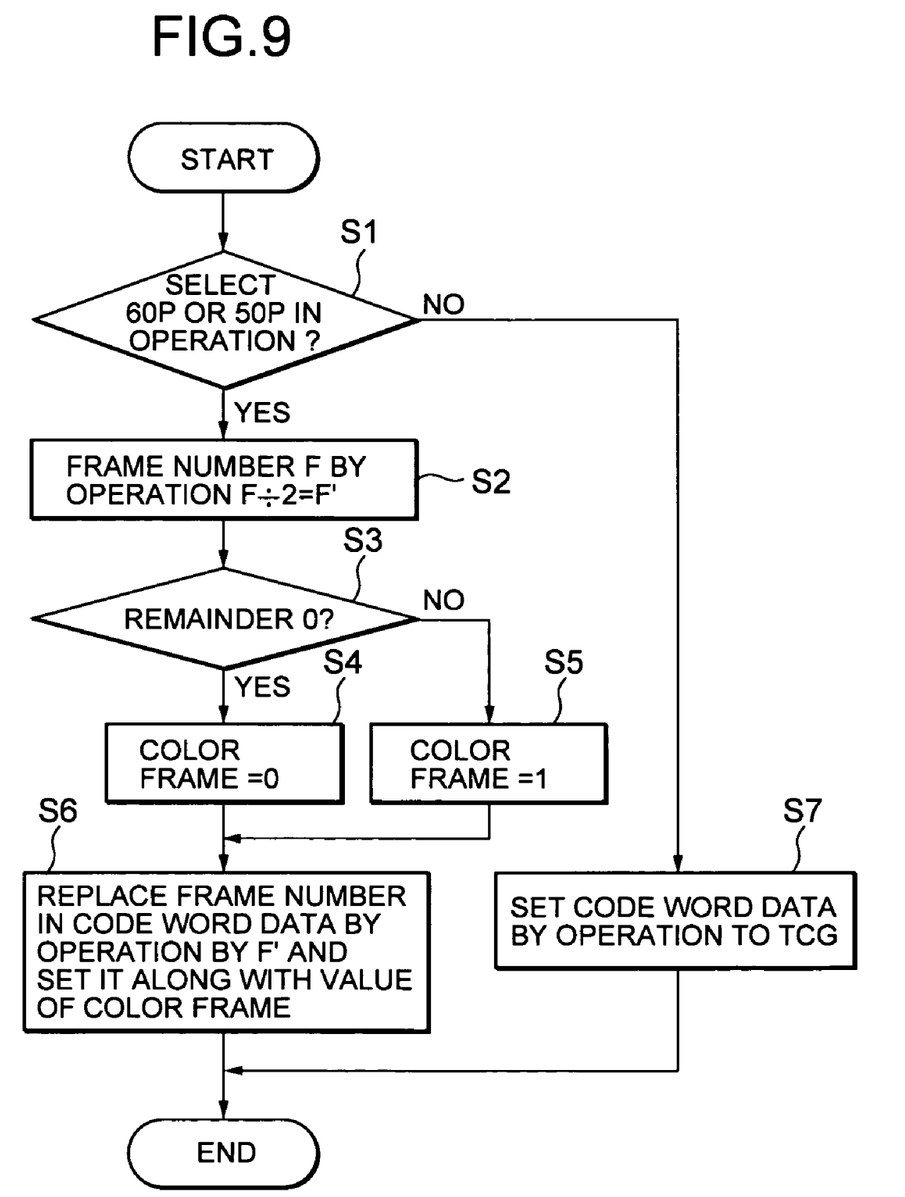
FIG. 9 is a flowchart showing a process in a generation of a time code, which is executed by a microcomputer shown in FIG. 8.

FIG. 9 is a flowchart showing a process executed by the microcomputer 2 in the generation of a time code (upon transmission of code word data from the operation panel 1). In this process, it is first determined whether the recording format selected on the operation panel 1 is any one of 60P and 50P or not (step S1).

If the result is YES, a value F of a frame number in the code word data, which is set by the operation panel 1, is divided by 2 so as to obtain a quotient F' and a remainder (step S2).

Subsequently, it is determined whether a value of the remainder is "0" or not (step S3).

If the result is YES, a value of the 11th bit assigned to the color frame flag in the time code in the 25-frame system or in the 30-frame system is set to "0" (step S4). On the other hand, if NO, a value of the 11th bit assigned to the color frame flag is set to "1" (step S5).

Then, the value F of the frame number in the code word data by the operation on the operation panel 1 is replaced with the value of the quotient F'. In addition, the code word data, in which the value of the color flame flag (the value of the 11th bit) is set at the step S4 or S5 described above, is set to the time code generator 3 (step S6).

As a result, the time code in the 60-frame system in the code word format shown in FIG. 6 is generated from the time code generator 3.

On the other hand, if the result is NO at the step S1 (if the recording format selected on the operation panel 1 is 30P, 60i, 25P or 50i), the code word data set on the operation panel 1 is set to the time code generator 3 without any further process (step S7).

As a result, the time code in the 25-frame system or the 30-frame system as shown in FIG. 2 or 3 is generated from the time code generator 3.

The microcomputer 2 counts up an initial value of the time address in the code word data set on the operation panel 1 in synchronization with a clock generated in a frame cycle while executing the process shown in FIG. 9 for the current frame number for each frame cycle.

Figure 10:
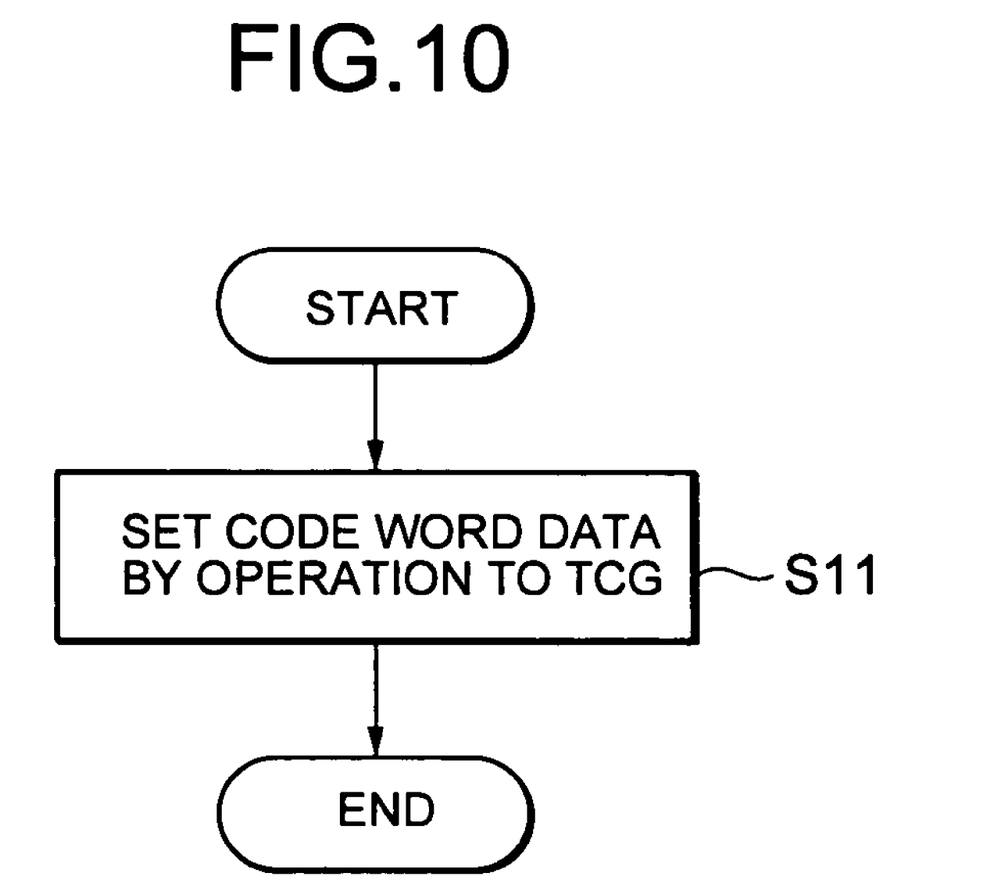
FIG. 10 is a flowchart showing an existing process in the generation of a time code.

FIG. 10 is a flowchart showing a process to be executed by the microcomputer 2, assuming that only a time code in an existing 25-frame system or 30-frame system is generated from the time code generator 3. In this process, as at the step S7 in the process shown in FIG. 9, the code word data set on the operation panel 1 is set to the time code generator 3 without any further process (step S11).

Therefore, only a slight change of adding a process at the steps S1 to S6 shown in FIG. 9 to the existing process allows the generation of both the time code in the 60-frame system and the time code in the 25-frame system or the 30-frame system from the time code generator 3.

Figure 11:
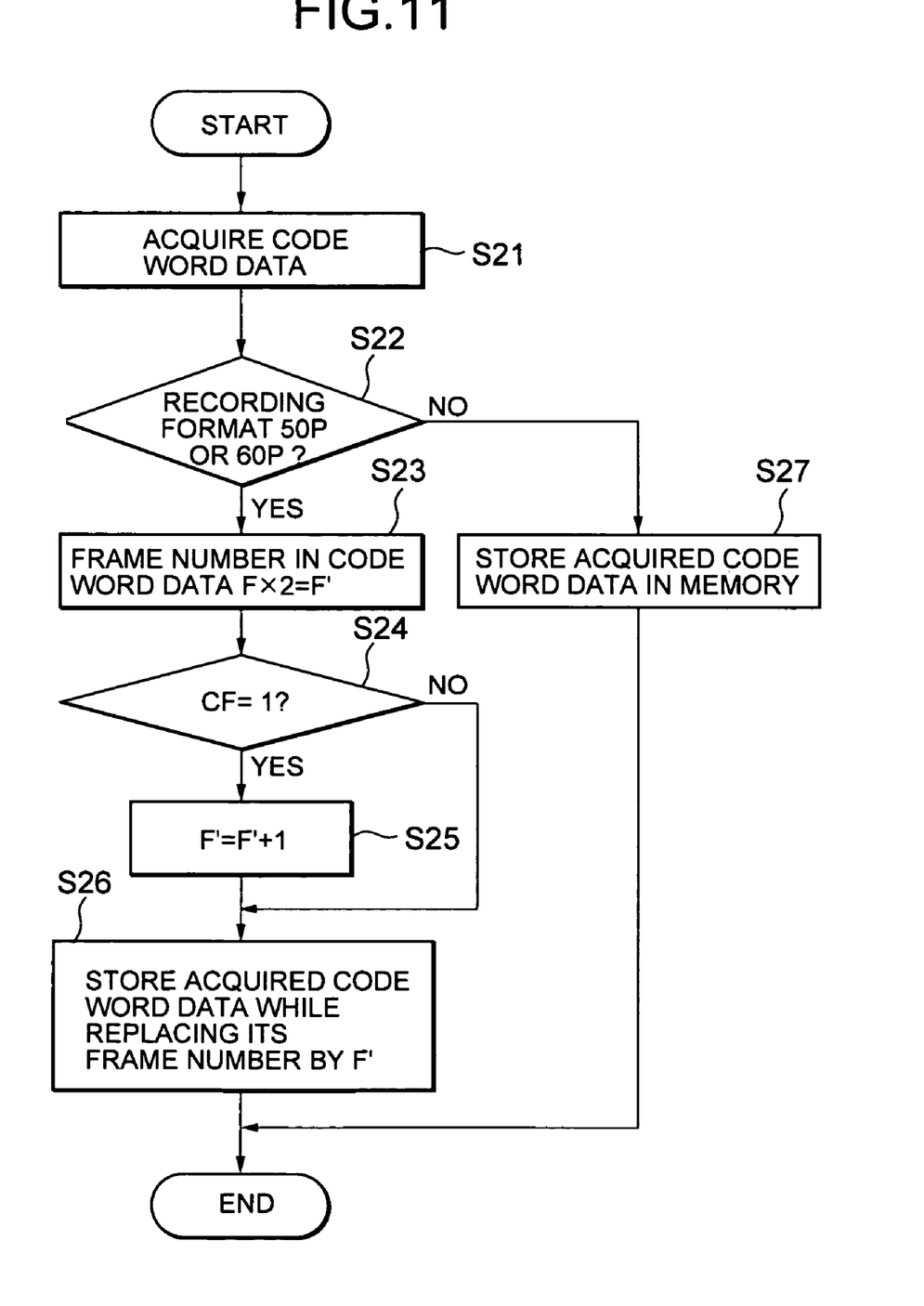
FIG. 11 is a flowchart showing a process in the reading of a time code, which is executed by a microcomputer shown in FIG. 8.

Next, FIG. 11 is a flowchart showing a process executed by the microcomputer 2 when the time code is read by the time code reader 9. In this process, the code word data of the time code transmitted from the time code reader 9 is first acquired (step S21). Then, it is determined whether the recording format is any one of 60P and 50P or not, based on the recording format information transmitted from the reproduction circuit 8 (step S22).

If the result is YES, the value F of the frame number in the code word data is multiplied by 2 so as to obtain a value F' (step S23). Then, it is determined whether a value of the color frame flag (a value of the 11th bit) in the code word data is "1" or not (step S24).

If the result is YES, "1" is added to the value F' (step S25). On the other hand, if NO, such addition is not performed. Then, after the value of the frame number is replaced with the value F', the code word data is stored in a memory in the microcomputer 2 (step S26).

As a result of the process described above, the frame number indicated by the time code in the 60-frame system in the code word format shown in FIG. 6 is correctly read so as to be stored.

On the other hand, if the result at the step S22 is NO (the recording format is 30P, 60i, 25P or 50i), the acquired code word data is stored in the memory in the microcomputer 2 without any further process (step S27).

As a result, the frame number indicated by the time code in the 25-frame system or the 30-frame system as shown in FIG. 2 or 3 is correctly read so as to be stored.

The microcomputer 2 executes the process shown in FIG. 11 for each code word data for each frame transmitted from the time code reader 9.

Figure 12:
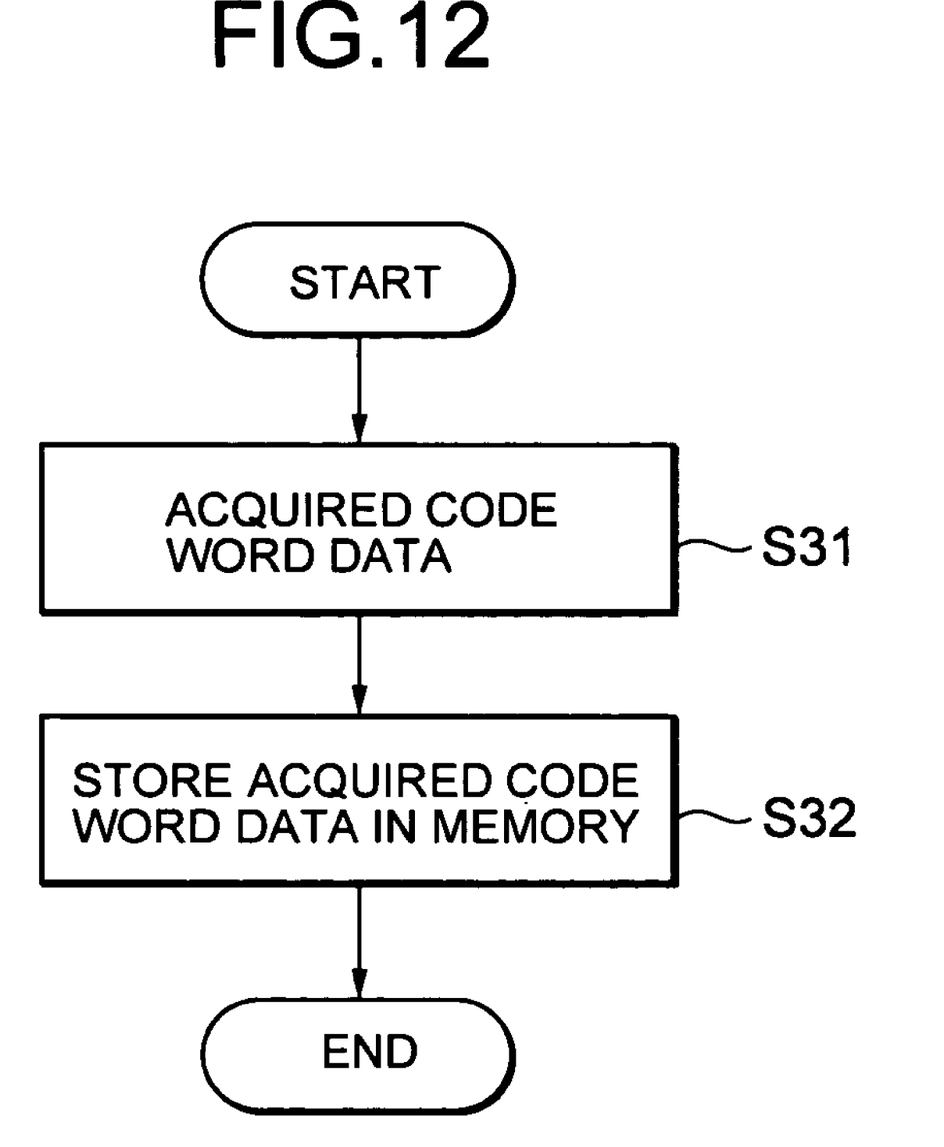
FIG. 12 is a flowchart showing an existing process in the reading of a time code.

FIG. 12 is a flowchart showing a process to be executed by the microcomputer 2, assuming that only a time code in an existing 25-frame system or 30-frame system is read by the time code reader 9. In this process, as at the step S21 in the process shown in FIG. 11, the code word data of the time code transmitted from the time code reader 9 is acquired (step S31). Then, as at the step S27 in the process shown in FIG. 11, the acquired code word data is stored in the memory in the microcomputer 2 without any further process (step S32).

Therefore, only a slight change of adding a process at the steps S22 to S26 shown in FIG. 11 to the existing process allows the correct reading of both the frame number indicated by the time code in the 60-frame system and the frame number indicated by the time code in the 25-frame system or the 30-frame system.

In the last place, a drop frame correction process to be executed by the microcomputer 2 in the case where the digital VTR has 59.94P as a selectable recording format of video data will be described.

In the time code in the 30-frame system, drop frame correction is performed in order to compensate for a difference between elapsed time and real time in 59.94i (NTSC). As shown in the left column of FIG. 13, when a time address is counted up, frames of the frame numbers 00 and 01 are dropped from the count at every minute, except every tenth minute (00, 10, 20, 30, 40, 50). Therefore the frames are dropped by 0.1% (drop 18 frames from 18000 frames for 10 minutes).

Similarly, in the time code in the 60-frame system shown in FIG. 6, it is necessary to drop frames by 0.1% so as to compensate for a difference between elapsed time and real time in 59.94P. Since the number of frames for a minute is double that in the 30-frame system, the number of frames to be dropped should be also double that in the drop frame correction in the 30-frame system.

Also in this case, in consideration of the interchangeability with the time code in the 30-frame system, it is appropriate to drop a double number of frames at the same timing as that of dropping the frames in the drop frame correction in the 30-frame system.

Figure 13:
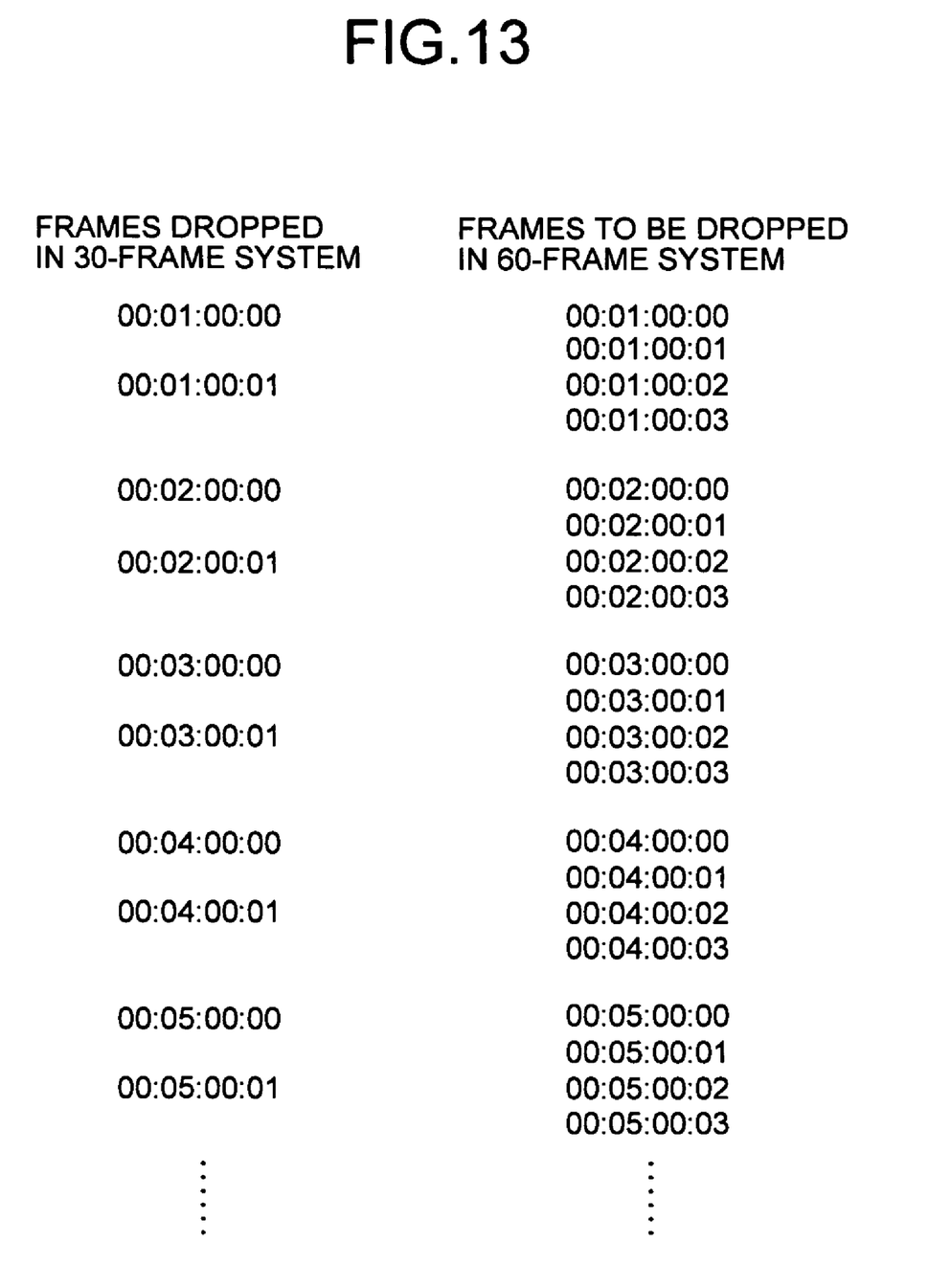
FIG. 13 is a diagram showing a frame to be dropped in drop frame correction in a time code in a 60-frame system.

Therefore, in the case where 59.94P is selected as a recording format of video data, as shown in the right column in FIG. 13, it is suitable to make the microcomputer 2 drop the frames of the frame numbers 00, 01, 02 and 03 at every minute, except every tenth minute (00, 10, 20, 30, 40, 50) from the count when the time address is counted up in the generation of the time code (upon transmission of the code word data from the operation panel 1).

As described above, in the digital VTR, only a slight change in an existing process provides the compatibility with 50P, 60P or 59.94P. In addition, a time code having interchangeability with existing time codes is generated so as to be recorded onto a tape together with video data. Such a time code can also be read from reproduction data from the tape.

Furthermore, in the case where the digital VTR has 59.94P as a selectable recording format of video data, drop frame correction for compensating for a difference between elapsed time and real time in 59.94P can also be performed.

In the above-described embodiments, the microcomputer 2 executes the processes shown in FIGS. 9 and 11 in the generation and in the reading of a time code. However, as an alternative embodiment, a circuit for implementing these processes with hardware may be provided instead of the microcomputer 2. Also in this case, only a slight change in an existing circuit provides the compatibility with 50P, 60P or 59.94P. In addition, a time code having interchangeability with an existing time code can be generated so as to be recorded onto a tape together with video data, and such a time code can be read from reproduction data from the tape.

In the above-described embodiments, the microcomputer 2 is provided in addition to the existing time code generator 3 and time code reader 9. As an alternative embodiment, however, a time code generator including a microcomputer for executing the same process as that shown in FIG. 9 (or a circuit for implementing the process with hardware) or a time code reader including a microcomputer for executing the same process as that shown in FIG. 11 (or a circuit for implementing the process in a hardware format) may be manufactured so as to be provided in the digital VTR.

Moreover, although the present invention is applied to a digital VTR in the above embodiment, the application of the present invention is not limited thereto. The present invention is also applicable to a time code generator or a time code reader as a single unit device.

Furthermore, it is apparent that the present invention is not limited to the above-described embodiment and may have various other structures without departing the scope of the invention.

What is claimed is:

1. A time code generator comprising:
    means for dividing a frame number indicated by time address data in supplied code word data by 2 so as to obtain a quotient and a remainder; and
    means for replacing said frame number indicated by said time address data in said code word data with a value of said quotient and for generating a time code based on the code word data in which a value of a color frame flag is set to 0 if a value of said remainder is 0, and for replacing said frame number indicated by said time address data in said code word data with said value of said quotient and for generating a time code based on the code word data in which said value of said color frame flag is set to 1 if said value of said remainder is 1.

2. The time code generator according to claim 1, further comprising means for performing drop frame correction by dropping frames of frame numbers 00, 01, 02 and 03 at every minute, except every tenth minute (00, 10, 20, 30, 40, 50).

3. A time code generating method, comprising the steps of:
    dividing a frame number indicated by time address data in supplied code word data by 2 so as to obtain a quotient and a remainder; and
    replacing said frame number indicated by said time address data in said code word data with a value of said quotient and generating a time code based on the code word data in which a value of a color frame flag is set to 0 if a value of said remainder is 0, and replacing said frame number indicated by said time address data in said code word data with said value of said quotient and generating a time code based on the code word data in which said value of said color frame flag is set to 1 if said value of said remainder is 1.

4. The time code generating method according to claim 3, further comprising a step of performing drop frame correction by dropping frames of frame numbers 00, 01, 02 and 03 at every minute, except every tenth minute (00, 10, 20, 30, 40, 50).

5. A time code reader comprising:
    means for reading a time code;
    means for multiplying a frame number indicated by time address data in said time code by 2 to obtain a product; and
    means for replacing said frame number indicated by said time address data in said time code with a value obtained by adding 1 to said product if a value of a color frame flag in said time code is 1, and for replacing said frame number indicated by said time address data in said time code with said value of said product if said value of said color frame flag in said time code is 0.

6. A time code reading method comprising the steps of:
    reading a time code;
    multiplying a frame number indicated by time address data in said time code by 2 to obtain a product; and
    replacing said frame number indicated by said time address data in said time code with a value obtained by adding 1 to said product if a value of a color frame flag in said time code is 1, and replacing said frame number indicated by said time address data in said time code with said value of said product if said value of said color frame flag in said time code is 0.

7. A video recording and reproducing apparatus comprising:
    means for dividing a frame number indicated by time address data in supplied code word data by 2 so as to obtain a quotient and a remainder;
    means for replacing said frame number indicated by said time address data in said code word data with a value of said quotient and for generating a time code based on the code word data in which a value of a color frame flag is set to 0 if a value of said remainder is 0, and for replacing said frame number indicated by said time address data in said code word data with said value of said quotient and for generating a time code based on the code word data in which said value of said color frame flag is set to 1 if said value of said remainder is 1;
    means for recording supplied video data with said generated time code onto a recording medium;
    means for reproducing data from said recording medium;
    means for reading the time code from said reproduced data;
    means for multiplying a frame number indicated by time address data in said readout time code by 2 to obtain a product; and
    replacing said frame number indicated by said time address data in said time code with a value obtained by adding 1 to said product if a value of a color frame flag in said readout time code is 1, and for replacing said frame number indicated by said time address data in said readout time code with said value of product if said value of said color frame flag in said readout time code is 0.

8. The video recording and reproducing apparatus according to claim 7, further comprising means for performing drop frame correction by dropping frames of frame numbers 00, 01, 02 and 03 at every minute, except every tenth minute (00, 10, 20, 30, 40, 50).

* * * * *